Patented May 25, 1954

2,679,520

UNITED STATES PATENT OFFICE 2,679,520

OXYPROPYLATED ESTERS OF POLYCARBOXYLIC ACIDS

Melvin De Groote, St. Louis, Mo., assignor to Petrolite Corporation, a corporation of Delaware No Drawing. Application January 9, 1952,
Serial No. 265,708

9 Claims. (Cl. 260—475)

The present invention is concerned with certain new chemical products, compounds or compositions which have useful application in various arts.

The particular compounds subsequently described herein in greater detail are hydrophile synthetic products, and more particularly, fractional esters obtained from polycarboxy acids and polyhydroxylated compounds obtained by the oxypropylation of a polyglycerol or etherized polyglycerol with the proviso that such etherized polyglycerol have at least four hydroxyl radicals and that the ether radical be derived from a monohydroxylated compound, such as an alcohol, phenol, or the like, having less than 8 carbon atoms. Examples include the aliphatic alcohols, alicyclic alcohols such as hexanol and methyl hexanol, phenols such as hydroxy benzene or cresol, benzyl alcohol and its alicyclic analogues, etc. My preference is that the ether group contain at least three carbon atoms and preferably be derived from a water-soluble alcohol such as propyl alcohol, butyl alcohol or amyl alcohol. In the case of butyl or amyl alcohols some of the isomers are water-soluble to the extent that they show solubility of at least a few percent at room temperature. Other alcohols which can be employed include tetrahydropyran-2-methanol and tetrahydrofurfuryl alcohol.

The products of this invention are of particular value for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion. This use of the particular products described herein is described and claimed in my copending application Serial No. 179,401, filed August 14, 1950, and now abandoned, of which the present application is a continuation-in-part. Application 179,401 was a continuation-in-part of my application Serial No. 104,801, filed July 14, 1949, now Patent No. 2,552,528, dated May 15, 1951.

The products are also useful for separating emulsions which have been prepared under controlled conditions from mineral oil, such as crude oil and relatively soft waters or weak brines. Controlled demulsification and subsequent demulsification under the conditions just mentioned are of significant value in removing impurities particularly inorganic salts from pipeline oil.

The present invention is concerned with hydrophile synthetic products; said hydrophile synthetic products being the acidic fractional esters derived by reaction between (A) a polycarboxy acid and (B) high molal oxypropylation derivatives of polyglycerols and ethers of polyglycerols, with the proviso that (a) the initial polyhydric reactant have at least 4 hydroxyl radicals; (b) the initial polyhydric reactant be free from any radical having at least 8 uninterrupted carbon atoms; (c) the initial polyhydric reactant be water-soluble; (d) the oxypropylation end product be water-insoluble; (e) the oxypropylation end product be within the molecular weight range of 2,000 to 25,000 on an average statistical basis; (f) the solubility characteristics of the oxypropylation end product in respect to water and organic solvents be substantially the result of the oxypropylation step; (g) the ratio of propylene oxide per hydroxyl in the original polyhydric reactant be within the range of 7 to 80; (h) the initial polyglycerol reactant represent not more than 12½% by weight of the oxypropylation and product on a statistical basis, and (i) the preceding provisos being based on complete reaction involving the propylene oxide and the initial polyhydric reactant; and (C) with the final proviso that the reaction ratio of (A) to (B) be one mole of (A) for each hydroxyl radical present in (B).

The preparation of polyglycerols, particularly diglycerol, is well known. For example, reference is made to the following patents: U. S. Patents Nos. 1,126,467, 2,382,764, 2,487,208, and 2,477,550.

Ethers of polyglycerols can be prepared in any one of a number of ways. For example, the same procedure employed to convert glycerol into an ether can be employed generally to convert a polyglycerol into an ether.

As to patents that illustrate such procedures see U. S. Patent Nos. 1,959,930, 2,089,569, 2,164,-007, 2,131,100, 2,221,818, 2,314,039, 2,380,185, 2,-453,634, 2,413,860, 2,010,726, and 2,258,892.

See also pamphlet entitled "Epichlorohydrin," issued by Shell Chemical Corporation, New York city, New York.

Since polyglycerol may be acyclic or cyclic it is obvious that formation of rings eliminates hydroxyls and thus if in doubt a compound should be examined in the usual manner to determine that there are at least four hydroxyl radicals present. Generally this involves nothing more than the molecular weight determination and a hydroxyl determination, particularly if the method of manufacture is known.

Other methods of manufacture are obvious; for example, reacting glycerol with one or more moles of glycide. Another procedure involves the reaction of an ether, such as glycerol alpha gamma di-isopropyl ether, with three or more moles of glycide. The same procedure can be employed in connection with glycerol alpha gamma diphenyl ether. Other procedures involve the reaction of glycerol alpha allyl ether, glycerol alpha ethyl ether, glycerol alpha isopropyl ether, glycerol alpha phenyl ether, or the like, with a mole of glycide. Another procedure involves the reaction of diglycerol with a mole of allyl glycidyl ether, glycidyl isopropyl ether, glycidyl phenyl ether, or similar compounds. Needless to say, any one of a number of reactions involve the use of epichlorohydrin or a simple derivative thereof to yield hydroxylated compounds of the kind herein employed as initial raw materials.

Other procedures have been described, or are obvious, in which reactants such as glycerol monochlorohydrin, glycerol dichlorohydrin, and allyloxy-3-chloro-2-propanol, chloro-3-isopropoxy-2-propanol, and the like are employed.

Much of what is said hereinafter is concerned with diglycerol for the reason that it can be obtained commercially and is entirely satisfactory for the purpose.

Having obtained the oxypropylated compound of the kind hereinafter described in greater detail, i. e., by treating a polyglycerol or ether thereof with sufficient propylene oxide so as to introduce approximately 7 to 80 moles of propylene oxide per hydroxyl radical, the product so obtained is then converted into an acidic ester by reaction with a polycarboxy acid so as to introduce one mole of the acid for each hydroxyl radical. Such esterification is conducted under comparatively mild conditions so as to prevent polymerization, i. e., the final product is an acidic ester of the initial hydroxylated material and not a polyester.

For convenience, what is said hereinafter will be divided into four sections:

Part 1 is concerned with the preparation of the oxypropylation derivatives of the polyglycerol or polyglycerol ethers of the kind described;

Part 2 is concerned with the preparation of the esters from the oxypropylated derivatives;

Part 3 is concerned with the structure of the polyhydroxylated compounds and particularly after oxypropylation, and its relationship to methods of describing the ultimate demulsifiers; and Part 4 is concerned with certain derivatives which can be obtained from the oxypropylated intermediates. In some instances such derivatives are obtained by modest oxyethylation, preceding the oxypropylation step, or by oxypropylation followed by oxyethylation. This results in intermediates having somewhat different properties which can be reacted with the same polycarboxy acids or anhydrides described in Part 2. For this reason a description of the apparatus makes casual mention of oxyethylation. For the same reason there is brief mention of the use of glycide and also in the latter instance this is significant insofar that glycide has been specified as a reactant in this introductory presentation for the preparation of polyglycerols.

PART 1

Oxypropylation, like other oxyalkylation operations, should be carried out with due care, in equipment specially designed for the purpose and with precautions that are now reasonably well understood. Reference is made to the discussion of the factors involved in oxypropylation which appears in Patent 2,626,918, column 5 through column 8, the considerations and the technique there discussed being equally applicable to the production of the compounds of the present application. In view of this reference to Patent 2,626,918, no general discussion of the factors involved in oxypropylation is given here, and the procedure will simply be illustrated by the following examples:

Example 1a

The particular autoclave employed was one with a capacity of approximately 15 gallons, or on the average of about 120 pounds of reaction mass. The speed of the stirrer could be varied from 150 to 340 R. P. M. Slightly over 6½ pounds of a commercial diglycerol of high purity were charged into the autoclave along with a little over .6 pound caustic soda. The reaction pot was flushed out with nitrogen, the autoclave was sealed, and the automatic devices adjusted and set for injecting a total of almost 62 pounds of propylene oxide in a 9-hour period. The pressure regulator was set for a maximum of 35 pounds per square inch. However, in this particular step and in all the succeeding steps the pressure never got over 30 pounds per square inch. In fact, this meant that the bulk of the reaction could take place and did take place at an appreciably lower pressure. This comparatively low pressure was the result of the fact that considerable catalyst was present, the propylene oxide was added comparatively slowly and, more important, the selected temperature range was 205° to 215° F. (about the boiling point of water). The initial introduction of the propylene oxide was not started until the heating devices had raised the temperature to approximately the boiling point of water. At the completion of the reaction a sample was taken and oxypropylation proceeded as in Example 2a, immediately succeeding.

*Example 2a*

45 pounds of the reaction mass identified as Example 1a were permitted to remain in the reaction vessel and without the addition of any more catalyst approximately 16 pounds more of propylene oxide were added. The oxypropylation was conducted in substantially the same manner in regard to pressure and temperature as in Example 1a, preceding, except that the reaction was completed in six hours. At the end of the reaction period part of the sample was withdrawn and oxypropylation was continued as described in Example 3a, following.

*Example 3a*

Approximately 52¾ pounds of the reaction mass identified as Example 2a, preceding, were permitted to stay in the reaction vessel. About 26¾ pounds of propylene oxide were introduced during this period. No additional catalyst was added. The conditions of reaction as far as temperature and pressure were concerned. substantially the same as in Example 1a, preceding. The reaction time was 7 hours. At the completion of the reaction, part of the reaction mass was withdrawn and the remainder subjected to oxypropylation as described in Example 4a, succeeding.

*Example 4a*

57 pounds of the reaction mass were permitted to remain in the autoclave. No additional catalyst was introduced. Approximately 15½ pounds of propylene oxide were introduced in the same manner as described in Example 1a, preceding. Conditions in regard to temperature and pressure were substantially the same. In this instance the oxide was introduced in four hours. At the end of the reaction period part of the sample was withdrawn and the remainder of the reaction mass subjected to further oxypropylation as described in Example 5a, following.

*Example 5a*

Slightly over 64⅓ pounds of reaction mass were permitted to remain in the autoclave. No additional catalyst was introduced. Slightly over 27½ pounds of propylene oxide were introduced in the same manner as described in Example 1a, preceding. The conditions of temperature and pressure were substantially the same. The time required to introduce the oxide was 6 hours.

*Example 6a*

Approximately 66½ pounds of reaction mass were permitted to stay in the autoclave. No additional catalyst was added. This was subjected to reaction with about 9¼ pounds of propylene oxide. Conditions of reaction were substantially the same as described in Example 1a as far as temperature and pressure were concerned. The period required for addition of the oxide was 5½ hours.

*Example 7a*

Approximately 68¼ pounds of reaction mass were permitted to stay in the autoclave. Without adding any more catalyst this was subjected to reaction with approximately 20½ pounds of propylene oxide. Conditions of reaction were substantially the same as described in Example 1a as far as temperature and pressure were concerned. The time period required for the addition of this oxide was 7 hours.

*Example 8a*

Approximately 63 pounds of the reaction mass were permitted to stay in the autoclave. Without adding any more catalyst this was subjected to reaction with approximately 9 pounds of propylene oxide. Conditions of reaction were substantially the same as described in Example 1a, as far as temperature and pressure were concerned. The time required for the addition of this oxide was 8 hours.

What has been said herein is presented in tabular form in Table 1 immediately following, with some added information as to molecular weight and as to solubility of the reaction product in water, xylene and kerosene.

TABLE 1

| Ex. No. | Composition Before | | | Composition at End | | | | M. W. by Hyd. Determin. | Max. Temp., °F. | Max. Pres., lbs sq. in. | Time, hrs. |
|---|---|---|---|---|---|---|---|---|---|---|---|
| | H. C.[1] Amt., Lbs. | Oxide Amt., Lbs. | Catalyst, Lbs. | Theo. Mol. Wt. | H. C.[1] Amt., Lbs. | Oxide Amt., Lbs. | Catalyst, Lbs. | | | | |
| 1a | 6.56 | -------- | .62 | 1,745 | 6.56 | 61.83 | .62 | 1,453 | 205-215 | 30 | 8½ |
| 2a | 4.28 | 40.32 | .40 | 2,345 | 4.28 | 56.32 | .40 | 1,745 | 205-215 | 30 | 6 |
| 3a | 3.71 | 48.70 | .34 | 3,540 | 3.71 | 75.45 | .34 | 2,630 | 205-215 | 30 | 7 |
| 4a | 2.67 | 54.08 | .25 | 4,485 | 2.67 | 69.58 | .25 | 2,810 | 205-215 | 30 | 6 |
| 5a | 2.32 | 61.84 | .22 | 6,585 | 2.32 | 89.46 | .22 | 3,550 | 205-215 | 30 | 6 |
| 6a | 1.68 | 64.66 | .16 | 7,765 | 1.68 | 73.91 | .16 | 3,760 | 205-215 | 30 | 5.5 |
| 7a | 1.52 | 66.6 | .13 | 9,665 | 1.52 | 87.1 | .13 | 3,910 | 205-215 | 30 | 7 |
| 8a | 1.08 | 61.83 | .09 | 10,900 | 1.08 | 70.83 | .09 | 4,275 | 205-215 | 30 | 8 |

[1] The hydroxylated compound is acyclic diglycerol.

Examples 1a and 2a were soluble in water. Example 3a was not soluble but showed a tendency to emulsify. Example 4a was dispersible in water, i. e., did not emulsify as well as the previous example. Example 5a was largely insoluble in water, but a fraction of the mixture was dispersible. Also, note that Example 5a and all succeeding examples were soluble in kerosene. Examples 1a, 2a and 3a were not soluble in kerosene. Example 4a was dispersible in kerosene. Examples 1a through 8a were all soluble in xylene.

In all cases the oxypropylated derivative must be xylene-soluble and is preferably water-insoluble. My preference is to employ derivatives which are kerosene-soluble.

The final product, i. e., at the end of the oxypropylation step, was a somewhat viscous amber-colored fluid which was water-insoluble. This is characteristic of all various end products obtained in this series. These products were, of course, slightly alkaline due to the residual caustic soda employed. This would also be the case if sodium methylate were used as a catalyst.

Speaking of insolubility in water or solubility in kerosene such solubility test can be made simply by shaking small amounts of the materials in a test tube with water, for instance, using 1% to 5% approximately based on the amount of water present.

Needless to say, there is no complete conversion of propylene oxide into the desired hydroxylated compounds. This is indicated by the fact that the theoretical molecular weight based on a statistical average is greater than the molecular weight calculated by usual methods on basis of acetyl or hydroxyl value. Actually, there is no completely satisfactory method for determining molecular weights of these types of compounds with a high degree of accuracy when the molecular weights exceed 2,000. In some instances the acetyl value or hydroxyl value serves as satisfactorily as an index to the molecular weight as any other procedure, subject to the above limitations, and especially in the higher molecular weight range. If any difficulty is encountered in the manufacture of the esters as described in Part 2 the stoichiometrical amount of acid or acid compound should be taken which corresponds to the indicated acetyl or hydroxyl value. This matter has been discussed in the literature and is a matter of common knowledge and requires no further elaboration. In fact, it is illustrated by some of the examples appearing in the patent previously mentioned.

Using a smaller autoclave, i. e., one having a capacity of slightly less than one gallon, I have prepared a number of similar compounds from diglycerol ethers, for example, the product obtained by reacting one mole of diglycerol with one mole of glycidyl isopropyl ether and also with one mole of glycidyl phenyl ether. These ethers were oxypropylated in substantially the same manner and under substantially the same conditions as in Examples 1a through 8a, preceding. For sake of brevity the data are summarized in the following table:

TABLE 2

| Example No. | Reactant | Theoretical Molecular Weight | Molecular Weight by Hydroxyl Determination |
|---|---|---|---|
| 9a | Diglycerol ether obtained by reacting diglycerol with glycidyl isopropyl ether mole for mole. | 1,778 | 1,430 |
| 10a | | 2,360 | 1,765 |
| 11a | | 3,550 | 2,510 |
| 12a | | 4,515 | 3,000 |
| 13a | | 6,605 | 3,560 |
| 14a | | 7,830 | 3,850 |
| 15a | | 9,810 | 4,000 |
| 16a | | 11,250 | 4,400 |
| 17a | Diglycerol ether obtained by reacting diglycerol with glycidyl phenyl ether mole for mole. | 1,810 | 1,510 |
| 18a | | 2,400 | 1,805 |
| 19a | | 3,630 | 2,730 |
| 20a | | 4,605 | 3,100 |
| 21a | | 6,705 | 3,580 |
| 22a | | 7,900 | 3,880 |
| 23a | | 9,950 | 4,080 |
| 24a | | 11,800 | 4,630 |

The above products were comparable in physical appearance although somewhat more kerosene-soluble and less water-soluble than the corresponding ones derived from diglycerol.

PART 2

As previously pointed out the present invention is concerned with acidic esters obtained from the oxypropylated derivatives described in Part 1, immediately preceding, and polycarboxy acids, particulraly dicarboxy acids such as adipic acid, phthalic acid, or anhydride, succinic acid, diglycollic acid, sebacic acid, azelaic acid, aconitic acid, maleic acid or anhydride, citraconic acid or anhydride, maleic acid or anhydride adducts as obtained by the Diels-Alder reaction from reactants such as maleic anhydride and cyclopentadiene. Such acids should be heat stable so they are not decomposed during esterification. They may contain as many as 36 carbon atoms as, for example, the acids obtained by dimerization of unsaturated fatty acids, unsaturated monocarboxy fatty acids, or unsaturated monocarboxy acids having 18 carbon atoms. Reference to the acid in the hereto appended claims obviously includes the anhydrides or any other obvious equivalents. My preference, however, is to use polycarboxy acids having not over 8 carbon atoms.

The production of esters including acid esters (fractional esters) from polycarboxy acids and glycols or other hydroxylated compounds is well known. Needless to say, various compounds may be used such as the low molal ester, the anhydride, the acyl chloride, etc. However, for purpose of economy it is customary to use either the acid or the anhydride. A conventional procedure is employed. On a laboratory scale one can employ a resin pot of the kind described in U. S. Patent No. 2,499,370, dated March 7, 1950 to De Groote and Keiser, and particularly with one more opening to permit the use of a porous spreader if hydrochloric acid gas is to be used as a catalyst. Such device or absorption spreader consists of minute Alundum thimbles which are connected to a glass tube. One can add a sulfonic acid such as para-toluene sulfonic acid as a catalyst. There is some objection to this because in some instances there is some evidence that this acid catalyst tends to decompose or rearrange oxypropylated compounds, and particularly likely to do so if the esterification temperature is too high. In the case of polycarboxy acids such as diglycollic acid, which is strongly acidic there is no need to add any catalyst. The use of hydrochloric gas has one advantage over paratoluene sulfonic acid and that is that at the end of the reaction it can be removed by flushing out with nitrogen, whereas there is no reasonably convenient means available of removing the paratoluene sulfonic acid or other sulfonic acid employed. If hydrochloric acid is employed one need only pass the gas through at an exceedingly slow rate so as to keep the reaction mass acidic. Only a trace of acid need be present. I have employed hydrochloric acid gas or the aqueous acid itself to eliminate the initial basic material. My preference, however, is to use no catalyst whatsoever and to insure complete dryness of the polyglycerol as described in the final procedure just preceding Table 3.

The products obtained in Part 1 preceding may contain a basic catalyst. As a general procedure I have added an amount of half-concentrated hydrochloric acid considerably in excess of what is required to neutralize the residual catalyst. The mixture is shaken thoroughly and allowed to stand overnight. It is then filtered and refluxed with the xylene present until the water can be separated in a phase-separating trap. As soon as the product is substantially free from water the distillation stops. This preliminary step can be carried out in the flask to be used for esterification. If there is any further deposition of sodium chloride during the reflux stage needless to say a second filtration may be required. In any event the neutral or slightly acidic solution of the oxypropylated derivatives described in Part 1 is then diluted further with sufficient xylene, decalin, petroleum solvent, or the like, so that one has obtained approximately a 45% solution. To this solution there is added a polycarboxylated reactant as previously described, such as phthalic anhydride, succinic acid or anhydride, diglycollic acid, etc. The mixture is refluxed until esterification is complete as indicated by elimination of water or drop in carboxyl value. Needless to say, if one produces a half-ester from an anhydride such as phthalic anhydride, no water is eliminated. However, if it is obtained from diglycollic acid, for example, water is eliminated. All such procedures are conventional and have been so thoroughly described in the literature that further consideration will be limited to a few examples and a comprehensive table.

Other procedures for eliminating the basic residual catalyst, if any, can be employed. For example, the oxyalkylation can be conducted in absence of a solvent or the solvent removed after oxypropylation. Such oxypropylation end product can then be acidified with just enough concentrated hydrochloric acid to just neutralize the residual basic catalyst. To this product one can then add a small amount of anhydrous sodium sulfate (sufficient in quantity to take up any water that is present) and then subject the mass to centrifugal force so as to eliminate the hydrated sodium sulfate and probably the sodium chloride formed. The clear somewhat viscous straw-colored amber liquid so obtained may contain a small amount of sodium sulfate or sodium chloride but, in any event, is perfectly acceptable for esterification in the manner described.

It is to be pointed out that the products here described are not polyesters in the sense that there is a plurality of both polyglycerol radicals and acid radicals; the product is characterized by having only one polyglycerol radical.

In some instances and, in fact, in many instances I have found that in spite of the dehydration methods employed above that a mere trace of water still comes through and that this mere trace of water certainly interferes with the acetyl or hydroxyl value determination, at least when a number of conventional procedures are used, and may retard esterification, particularly where there is no sulfonic acid or hydrochloric acid present as a catalyst. Therefore, I have preferred to use the following procedure: I have employed about 200 grams of the polyglycerol as described in Part 1, preceding; I have added about 60 grams of benzene, and then refluxed this mixture in the glass resin pot using a phase-separating trap until the benzene carried out all the water present as water of solution or the equivalent. Ordinarily this refluxing temperature is apt to be in the neighborhood of 130° to possibly 150° C. When all this water or moisture has been removed I also withdraw approximately 20 grams or a little less benzene and then add the required amount of the carboxy reactant and also about 150 grams of a high boiling aromatic petroleum solvent. These solvents are sold by various oil refineries and, as far as solvent effect act as if they were almost completely aromatic in character. Typical distillation data in the particular type I have employed and found very satisfactory is the following:

| I. B. P., 142° C. | 50 ml., 242° C. |
| 5 ml., 200° C. | 55 ml., 244° C. |
| 10 ml., 209° C. | 60 ml., 248° C. |
| 15 ml., 215° C. | 65 ml., 252° C. |
| 20 ml., 216° C. | 70 ml., 252° C. |
| 25 ml., 220° C. | 75 ml., 260° C. |
| 30 ml., 225° C. | 80 ml., 264° C. |
| 35 ml., 230° C. | 85 ml., 270° C. |
| 40 ml., 234° C. | 90 ml., 280° C. |
| 45 ml., 237° C. | 95 ml., 307° C. |

After this material is added, refluxing is continued and, of course, is at a higher temperature, to wit, about 160° to 170° C. If the carboxy reactant is an anhydride needless to say no water of reaction appears; if the carboxy reactant is an acid water of reaction should appear and should be eliminated at the above reaction temperature. If it is not eliminated I simply separate out another 10 or 20 cc. of benzene by means of the phase-separating trap and thus raise the temperature to 180° or 190° C., or even to 200° C., if need be. My preference is not to go above about 200° C.

The use of such solvent is extremely satisfactory provided one does not attempt to remove the solvent subsequently except by vacuum distillation and provided there is no objection to a little residue. Actually, when these materials are used for a purpose such as demulsification the solvent might just as well be allowed to remain. If the solvent is to be removed by distillation, and particularly vacuum distillation, then the high boiling aromatic petroleum solvent might well be replaced by some more expensive solvent, such as decalin or an alkylated decalin which has a rather definite or close range boiling point. The removal of the solvent, of course, is purely a conventional procedure and requires no elaboration.

In the appended table Solvent #7-3, which appears in numerous instances, is a mixture of 7 volumes of the aromatic petroleum solvent previously described and 3 volumes of benzene. Reference to Solvent #7 means the particular petroleum solvent previously described in detail. This was used, or a similar mixture, in the manner previously described. A large number of the examples indicated employing decalin were repeated, using this mixture and particularly with the preliminary step of removing all the water. If one does not intend to remove the solvent my preference is to use the petroleum solvent-benzene mixture although obviously any of the other mixtures, such as decalin and xylene, can be employed.

The data included in the subsequent tables, i. e., Tables 3 and 4, are self-explanatory, and very complete and it is believed no further elaboration is necessary.

TABLE 3

| Ex. No. of Acid Ester | Ex. No. of Hydroxy Cmpd. | Theo. Mol. Wt. of H. C. | Theo. Hydroxyl Value of H. C. | Actual Hydroxyl Value | Mol. Wt. Based on Actual H. V. | Amt. of Hyd. Cmpd. (grs.) | Polycarboxy Reactant | Amt. of Polycarboxy Reactant (grs.) |
|---|---|---|---|---|---|---|---|---|
| 1b* | 1a | 1,745 | 128.5 | 154 | 1,453 | 200 | Diglycollic Acid | 73.8 |
| 2b | 1a | 1,745 | 128.5 | 154 | 1,453 | 200 | Phthalic Anhyd | 80.2 |
| 3b* | 1a | 1,745 | 128.5 | 154 | 1,453 | 200 | Maleic Anhyd | 54.0 |
| 4b | 1a | 1,745 | 128.5 | 154 | 1,453 | 200 | Aconitic Acid | 96.0 |
| 5b | 1a | 1,745 | 128.5 | 154 | 1,453 | 200 | Adipic Acid | 80.5 |
| 6b | 1a | 1,745 | 128.5 | 154 | 1,453 | 200 | Diglycollic Acid | 73.8 |
| 7b* | 1a | 1,745 | 128.5 | 154 | 1,453 | 200 | Maleic Anhyd | 54.0 |
| 8b | 1a | 1,745 | 128.5 | 154 | 1,453 | 200 | Maleic Anhyd | 54.0 |
| 9b | 2a | 2,345 | 98.4 | 131 | 1,745 | 200 | Diglycollic Acid | 61.6 |
| 10b | 2a | 2,345 | 98.4 | 131 | 1,745 | 200 | Phthalic Anhyd | 68.0 |
| 11b | 2a | 2,345 | 98.4 | 131 | 1,745 | 200 | Aconitic Acid | 80.0 |
| 12b* | 2a | 2,345 | 98.4 | 131 | 1,745 | 200 | Maleic Anhyd | 45.0 |
| 13b | 2a | 2,345 | 98.4 | 131 | 1,745 | 200 | Adipic Acid | 67.1 |
| 14b | 2a | 2,345 | 98.4 | 131 | 1,745 | 200 | Maleic Anhyd | 45.0 |
| 15b | 3a | 3,540 | 76.9 | 85.0 | 2,630 | 200 | Diglycollic Acid | 40.7 |
| 16b* | 3a | 3,540 | 76.9 | 85.0 | 2,630 | 200 | Maleic Anhyd | 29.8 |
| 17b | 3a | 3,540 | 76.9 | 85.0 | 2,630 | 200 | Phthalic Anhyd | 45.3 |
| 18b | 3a | 3,540 | 76.9 | 85.0 | 2,630 | 200 | Adipic Acid | 44.3 |
| 19b | 3a | 3,540 | 76.9 | 85.0 | 2,630 | 200 | Aconitic Acid | 52.8 |
| 20b | 3a | 3,540 | 76.9 | 85.0 | 2,630 | 200 | Maleic Anhyd | 29.8 |
| 21b | 4a | 4,485 | 50.0 | 79.7 | 2,810 | 200 | Diglycollic Acid | 38.2 |
| 22b | 4a | 4,485 | 50.0 | 79.7 | 2,810 | 200 | Phthalic Anhyd | 42.2 |
| 23b | 4a | 4,485 | 50.0 | 79.7 | 2,810 | 200 | Aconitic Acid | 49.6 |
| 24b | 4a | 4,485 | 50.0 | 79.7 | 2,810 | 200 | Maleic Anhyd | 27.9 |
| 25b | 4a | 4,485 | 50.0 | 79.7 | 2,810 | 200 | Adipic Acid | 41.7 |
| 26b | 5a | 6,585 | 34.0 | 63.1 | 3,550 | 200 | Diglycollic Acid | 30.1 |
| 27b | 5a | 6,585 | 34.0 | 63.1 | 3,550 | 200 | Phthalic Anhyd | 33.3 |
| 28b | 5a | 6,585 | 34.0 | 63.1 | 3,550 | 200 | Maleic Anhyd | 22.2 |
| 29b | 5a | 6,585 | 34.0 | 63.1 | 3,550 | 200 | Aconitic Acid | 39.2 |
| 30b | 5a | 6,585 | 34.0 | 63.1 | 3,550 | 200 | Adipic Acid | 32.8 |
| 31b | 6a | 7,765 | 28.8 | 59.6 | 3,760 | 200 | Diglycollic Acid | 28.4 |
| 32b | 6a | 7,765 | 28.8 | 59.6 | 3,760 | 200 | Phthalic Anhyd | 31.4 |
| 33b | 6a | 7,765 | 28.8 | 59.6 | 3,760 | 200 | Maleic Acid | 20.8 |
| 34b | 6a | 7,765 | 28.8 | 59.6 | 3,760 | 200 | Aconitic Anhyd | 36.9 |
| 35b | 6a | 7,765 | 28.8 | 59.6 | 3,760 | 200 | Adipic Anhyd | 31.0 |
| 36b | 7a | 9,665 | 23.2 | 47.3 | 3,910 | 200 | Diglycollic Acid | 30.1 |
| 37b | 7a | 9,665 | 23.2 | 47.3 | 3,910 | 200 | Maleic Anhyd | 22.1 |
| 38b | 7a | 9,665 | 23.2 | 47.3 | 3,910 | 200 | Phthalic Anhyd | 33.3 |
| 39b | 7a | 9,665 | 23.2 | 47.3 | 3,910 | 200 | Aconitic Acid | 39.0 |
| 40b | 7a | 9,665 | 23.2 | 47.3 | 3,910 | 200 | Adipic Acid | 32.8 |
| 41b | 8a | 10,900 | 20.6 | 52.4 | 4,275 | 200 | Diglycollic Acid | 25.0 |
| 42b | 8a | 10,900 | 20.6 | 52.4 | 4,275 | 200 | Phthalic Anhyd | 27.7 |
| 43b | 8a | 10,900 | 20.6 | 52.4 | 4,275 | 200 | Maleic Anhyd | 18.4 |
| 44b | 8a | 10,900 | 20.6 | 52.4 | 4,275 | 200 | Aconitic Acid | 32.6 |
| 45b | 8a | 10,900 | 20.6 | 52.4 | 4,275 | 200 | Citraconic Anhyd | 21.1 |

*These samples were not entirely satisfactory so were discarded and rerun, using approximately 20% less acid in each instance and approximately 10° to 20° lower temperature during esterification.

TABLE 4

| Ex. No. of Acid Ester | Solvent | Amt. Solvent (grs.) | Maximum Esterification Temp., °C. | Time of Esterification (hrs.) | Water Out (cc.) |
|---|---|---|---|---|---|
| 1b | #7 | 264 | 190 | 3 | 7.2. |
| 2b | #7 | 282 | 161 | 4 | 0.5. |
| 3b | #7 | 254 | 197 | 4½ | 13.5. |
| 4b | Decalin | 287 | 204 | 5 | 10.0. |
| 5b | #7 | 271 | 245 | 5½ | 10.0. |
| 6b | #7 | 264 | 220 | 2½ | 9.4. |
| 7b | #7 | 254 | 210 | ¾ | None. |
| 8b | #7 | 254 | 171 | 3 | 7.5. |
| 9b | #7 | 254 | 183 | 2¾ | 7.5. |
| 10b | #7 | 269 | 210 | 11¼ | None. |
| 11b | #7-3 | 272 | 224 | 6 | 7.2. |
| 12b | #7 | 246 | 151 | 4 | None. |
| 13b | #7 | 268 | 212 | 8 | 8.2. |
| 14b | #7-3 | 246 | 158 | 5 | None. |
| 15b | #7 | 235 | 207 | 6½ | 7.0. |
| 16b | #7-3 | 229 | 230 | 4½ | None. |
| 17b | #7-3 | 243 | 142 | 4½ | Do. |
| 18b | #7-3 | 239 | 212 | 4½ | 3. |
| 19b | #7-3 | 247 | 194 | 2½ | 5.2. |
| 20b | #7-3 | 229 | 141 | 4¾ | None. |
| 21b | #7-3 | 233 | 172 | 4 | 5.1. |
| 22b | #7-3 | 238 | 138 | 5¼ | None. |
| 23b | #7-3 | 245 | 186 | 4½ | 4.9. |
| 24b | #7-3 | 228 | 139 | 4½ | None. |
| 25b | #7-3 | 236 | 176 | 15¼ | 4.4. |
| 26b | #7-3 | 226 | 173 | 3½ | 4.0. |
| 27b | #7-3 | 233 | 167 | 5½ | None. |
| 28b | #7-3 | 222 | 152 | 5½ | Do. |
| 29b | #7-3 | 235 | 180 | 11¼ | 4.1. |
| 30b | #7-3 | 229 | 195 | 17¾ | 3.0. |
| 31b | #7-3 | 224 | 168 | 8¼ | 3.2. |
| 32b | #7-3 | 230 | 143 | 5½ | None. |
| 33b | #7-3 | 220 | 146 | 5½ | Do. |
| 34b | #7-3 | 228 | 178 | 3½ | 3.8. |
| 35b | #7-3 | 227 | 190 | 17 | 3.4. |
| 36b | #7-3 | 224 | 212 | 5 | 4.6. |
| 37b | #7-3 | 220 | 151 | 5 | None. |
| 38b | #7-3 | 230 | 191 | 5 | 0.2. |
| 39b | #7-3 | 232 | 202 | 3½ | 3.6. |
| 40b | #7-3 | 226 | 228 | 11½ | 3.2. |
| 41b | #7-3 | 222 | 180 | 4½ | 3.4 |
| 42b | #7-3 | 228 | 134 | 5¾ | None. |
| 43b | #7-3 | 218 | 151 | 5¾ | Do. |
| 44b | #7-3 | 230 | 211 | 5¾ | 2.0. |
| 45b | #7-3 | 221 | 144 | 2½ | None. |

The procedure for manufacturing the esters has been illustrated by preceding examples. If for any reason reaction does not take place in a manner that is acceptable, attention should be directed to the following details: (a) Recheck the hydroxyl or acetyl value of the oxypropylated polyglycerol and use a stoichiometrically equivalent amount of acid; (b) if the reaction does not proceed with reasonable speed either raise the temperature indicated or else extend the period of time up to 12 or 16 hours if need be; (c) if necessary, use ½% of paratoluene sulfonic acid or some other acid as a catalyst; (d) if the esterification does not produce a clear product a check should be made to see if an inorganic salt such as sodium chloride or sodium sulfate is not precipitating out. Such salt should be eliminated, at least for exploration experimentation, and can be removed by filtering. Everything else being equal as the size of the molecule increases the reactive hydroxyl radical represents a smaller fraction of the entire molecule and thus more difficulty is involved in obtaining complete esterification.

Even under the most carefully controlled conditions of oxypropylation involving comparatively low temperatures and long time of reaction there are formed certain compounds whose composition is still obscure. Such side reaction products can contribute a substantial proportion of the final cogeneric reaction mixture. Various suggestions have been made as to the nature of these compounds, such as being cyclic polymers of propylene oxide, dehydration products with the appearance of a vinyl radical, or isomers of propylene oxide or derivatives thereof, i. e., of an aldehyde, ketone, or allyl alcohol. In some instances an attempt to react the stoichiometric amount of a polycarboxy acid with the oxypropylated derivative results in an excess of the carboxylated reactant for the reason that apparently under conditions of reaction less reactive hydroxyl radicals are present than indicated by the hydroxyl value. Under such circumstances there is simply a residue of the carboxylic reactant which can be removed by filtration or, if desired, the esterification procedure can be repeated using an appropriately reduced ratio of carboxylic reactant.

Even the determination of the hydroxyl value and conventional procedure leaves much to be desired due either to the cogeneric materials previously referred to, or for that matter, the presence of any inorganic salts or propylene oxide. Obviously this oxide should be eliminated.

The solvent employed, if any, can be removed from the finished ester by distillation and particularly vacuum distillation. The intermediate products or liquids prior to esterification are generally pale amber to amber in color, and show moderate viscosity. They can be bleached with bleaching clays, filtering chars, and the like. However, for the purpose of demulsification or the like color is not a factor and decolorization is not justified.

In the above instance I have permitted the solvents to remain present in the final reaction mass. In other instances I have followed the same procedure using decalin or a mixture of decalin or benzene in the same manner and ultimately removed all the solvents by vacuum distillation. Appearances of the final products after esterification are much the same as the polyglycerols before esterification and in some instances were somewhat darker in color and had a reddish cast and perhaps somewhat more viscous.

PART 3

In the hereto appended claims my new products are described as esters obtained from polyhydroxylated materials having at least four hydroxyls. If one were concerned with a monohydroxylated material or a dihydroxylated material one might be able to write a formula which in essence would represent the particular product. However, in a more highly hydroxylated material the problem becomes increasingly more difficult for reasons which have already been indicated in connection with oxypropylation and which can be examined by merely considering for the moment a monohydroxylated material.

Oxypropylation involves the same sort of variations as appear in preparing high molal polypropylene glycols. Propylene glycol has a secondary alcoholic radical and a primary alcohol radical. Obviously then polypropylene glycols could be obtained, at least theoretically, in which two secondary alcoholic groups are united or a secondary alcohol group is united to a primary alcohol group, etherization being involved, of course, in each instance. Needless to say, the same situation applies when one has oxypropylated and polyhydric materials having 4 or more hydroxyls.

Usually no effort is made to differentiate between oxypropylation taking place, for example, at the primary alcohol unit radical or the secondary alcohol radical. Actually, when such products are obtained, such as a high molal polypropylene glycol or the products obtained in the manner herein described one does not obtain a single derivative such as $HO(RO)_nH$ or $—(RO)_nH$ in which $n$ has one value, for instance, 14, 15 or 16, or the like. Rather, one obtains a cogeneric mixture of closely related or touching homologues. These materials invariably have high molecular weights and cannot be separated from one another by any known procedures without decomposition. The properties of such mixture represent the contribution of the various individual members of the mixture. On a statistical basis, of course, $n$ can be appropriately specified.

The significant fact in regard to the oxypropylated polyglycerols and the ethers thereof, and particularly those obtained from acyclic diglycerol, is that although the initial products are all water-soluble in a theoretical molecular weight range in excess of 2,000 depending in part whether the initial product is etherized or not and the size of the etherized radical, one obtains water-insolubility. The product may tend to emulsify or disperse somewhat because some of the constituents, being a cogeneric mixture, are water-soluble but the bulk are insoluble. Thus one gets emulsifiability or dispersibility as noted. Such products are invariably xylene-soluble regardless of whether the original reactants were or not. In numerous instances usually at a theoretical molecular weight range of approximately twice the above, i. e., about 4,000, not only is the product substantially water-insoluble but it is kerosene-soluble. I have found these kerosene-soluble oxyalkylation products are most desirable for preparing the esters. I have prepared hydroxylated derivatives not only up to the theoretical molecular weights shown but also up to twice this value, i. e., approximately 25,000. Some of these were prepared from triglycerol, tetraglycerol and pentaglycerol. These in turn were prepared from glycerol or diglycerol and glycide. The exact composition is open to question insofar that it is approximately a mixture of polyglycerol plus an extremely small amount of initial reactant present. The reasons are obvious because the same conditions are maintained in oxyalkylation with glycide as with oxide. It is interesting to note, however, that the molecular weights based on hydroxyl determination at this point were considerably less, in the neighborhood of one-third or one-fourth this value, i. e., 6,000 to 7,000 and in a few instances, 8,000. It becomes obvious when polycarboxylic esters prepared from such high molecular weight materials there cannot be more terminal hydroxyls than were present initially, for instance, 4, 5, 6, 7, 8 or possibly 10 or 12. Likewise, the contribution to the total molecular weight made by the polycarboxy acid is small. By the same token one would expect the effectiveness of the products when used as demulsifiers to be comparable to the unesterified hydroxylated material. Remarkably enough, in many instances the product was distinctly better. This is true, also, of certain other derivatives referred to in my aforementioned Patent No. 2,552,528, and is true, also, in regard to what is said subsequently in Part 4.

PART 4

Previous reference has been made to other oxyalkylating agents other than propylene oxide, such as ethylene oxide. Obviously variants can be prepared which do not depart from what is said herein but do produce modifications. The polyhydroxylated compounds employed as intermediates can be reacted with ethylene oxide in modest amounts and then subjected to oxypropylation provided the resultant derivative is (a) comparatively water-insoluble as previously noted or at least beyond 2,000 on the theoretical weight basis previously noted and is preferably kerosene-soluble and in any event xylene-soluble and has from 7 to 80 alkylene oxide radicals per initial hydroxyl radical. Needless to say, in order to have water-insolubility and kerosene-solubility the large majority must be propylene oxide. Other variants suggest themselves as, for example, replacing propylene oxide by butylene oxide.

Needless to say then, one mole of diglycerol, triglycerol, or a similar polyglycerol or ether thereof can be treated with a small amount of ethylene oxide and then treated with propylene oxide so as to produce preferably the water-insoluble, kerosene-soluble derivative having 7 to 80 oxide radicals per initial hydroxyl as previously indicated. Similarly the propylene oxide can be added first and then the ethylene oxide, or random oxyalkylation can be employed using a mixture of the two oxides. The compounds so obtained are readily esterified in the same manner as described in Part 2, preceding. Incidentally, the polyhydroxylated compounds described in Part 1 or the modifications described therein can be treated with various reactants such as glycide, epichlorohydrin, dimethyl sulfate, sulfuric acid, maleic anhydride, ethylene imine, etc. If treated with epichlorohydrin or monochloroacetic acid the resultant product can be further reacted with a tertiary amine such as pyridine, or the like, to give quaternary ammonium compounds. If treated with maleic anhydride to give a total ester the resultant can be treated with sodium bisulfite to yield a sulfosuccinate. Sulfo groups can be introduced also by means of a sulfating agent as previously suggested, or by treating the chloroacetic acid resultant with sodium sulfite.

I have found that if such hydroxylated compound or compounds are reacted further so as to produce entirely new derivatives, such new derivatives have the properties of the original hydroxylated compound insofar that they are effective and valuable demulsifying agents for resolution of water-in-oil emulsions as found in the petroleum industry, as break inducers in doctor treatment of sour crude, etc.

Having thus described my invention what I claim as new and desire to secure by Letters Patent is,

1. A hydrophile synthetic product which is the ester of (A) an acid selected from the group consisting of acyclic and isocyclic polycarboxy acids having not more than 8 carbon atoms and composed of carbon, hydrogen and oxygen and (B) a high molal oxypropylated compound of the group consisting of oxypropylated polyglycerols having not more than 5 glycerol radicals per polyglycerol molecule and oxypropylated ethers of such polyglycerols with monohydroxylated compounds composed of carbon, hydrogen and oxygen, having the hydroxyl group as the only functional group and having not more than 8 carbon atoms, with the provisos that the high molal oxypropylated compound have at least 4 hydroxyl radicals, a molecular weight in the range of 2,000 to 25,000 on an average statistical basis, that the ratio of propylene oxide per hydroxyl therein be in the range of 7 to 80, that the oxypropylene groups therein constitute at least 87½% by weight on a statistical basis, that the preceding provisos are based on the assumption of complete reaction between the propylene oxide and the compound selected from the group consisting of polyglycerols and ethers of polyglycerols, and that the ratio of (A) to (B) be one mole of (A) for each hydroxyl group present in (B).

2. A hydrophile synthetic product which is the ester of (A) an acid selected from the group consisting of acyclic and isocyclic polycarboxy acids having not more than 8 carbon atoms and composed of carbon, hydrogen and oxygen and (B) a high molal oxypropylated polyglycerol having not more than 5 glycerol radicals per polyglycerol molecule, with the provisos that the high molal oxypropylated polyglycerol have at least 4 hydroxyl radicals, a molecular weight in the range of 2,000 to 25,000 on an average statistical basis, that the ratio of propylene oxide per hydroxyl therein be in the range of 7 to 80, that the oxypropylene groups therein constitute at least 87½% by weight on a statistical basis, that the preceding provisos are based on the assumption of complete reaction between the propylene oxide and the polyglycerol, and that the ratio of (A) to (B) be one mole of (A) for each hydroxyl group present in (B).

3. Products as in claim 2 in which the polyglycerol is acyclic diglycerol.

4. The product of claim 3 with the proviso that the theoretical molecular weight be within the range of 2,000 to 10,000 and that the polycarboxy acid be dicarboxy acid.

5. The product of claim 3 with the proviso that the theoretical molecular weight be within the range of 2,000 to 10,000 and that the polycarboxy acid be phthalic acid.

6. The product of claim 3 with the proviso that the theoretical molecular weight be within the range of 2,000 to 10,000 and that the polycarboxy acid be maleic acid.

7. The product of claim 3 with the proviso that the theoretical molecular weight be within the range of 2,000 to 10,000 and that the polycarboxy acid be succinic acid.

8. The product of claim 3 with the proviso that the theoretical molecular weight be within the range of 2,000 to 10,000 and that the polycarboxy acid be citraconic acid.

9. The product of claim 3 with the proviso that the theoretical molecular weight be within the range of 2,000 to 10,000 and that the polycarboxy acid be diglycollic acid.

References Cited in the file of this patent

UNITED STATES PATENTS

| Number | Name | Date |
|---|---|---|
| 2,554,667 | De Groote | May 29, 1951 |
| 2,562,878 | Blair | Aug. 7, 1951 |